US008286069B2

(12) United States Patent
Gavin et al.

(10) Patent No.: US 8,286,069 B2
(45) Date of Patent: Oct. 9, 2012

(54) SYSTEM AND METHOD FOR EDITING WEB-BASED VIDEO

(75) Inventors: Andrew Gavin, Pacific Palisades, CA (US); Scott Shumaker, Los Angeles, CA (US)

(73) Assignee: Myspace LLC, Beverly Hills, CA (US)

( * ) Notice: Subject to any disclaimer, the term of this patent is extended or adjusted under 35 U.S.C. 154(b) by 1149 days.

(21) Appl. No.: 12/011,770

(22) Filed: Jan. 28, 2008

(65) Prior Publication Data

US 2008/0212936 A1 Sep. 4, 2008

Related U.S. Application Data

(60) Provisional application No. 60/897,544, filed on Jan. 26, 2007, provisional application No. 60/897,552, filed on Jan. 26, 2007, provisional application No. 60/897,558, filed on Jan. 26, 2007, provisional application No. 60/897,559, filed on Jan. 26, 2007, provisional application No. 60/898,201, filed on Jan. 29, 2007, provisional application No. 60/913,204, filed on Apr. 20, 2007, provisional application No. 60/915,427, filed on May 1, 2007.

(51) Int. Cl.
*G06F 17/00* (2006.01)
*G06F 15/16* (2006.01)

(52) U.S. Cl. ........................ 715/202; 709/231; 709/234

(58) Field of Classification Search .................. 386/278, 386/290; 705/1, 1.1; 345/426, 86, 91, 114, 345/116; 715/726, 202, 738, 778; 709/231, 709/232, 234
See application file for complete search history.

(56) References Cited

U.S. PATENT DOCUMENTS

| | | | |
|---|---|---|---|
| 5,878,141 A | 3/1999 | Daly et al. | |
| 5,892,915 A | 4/1999 | Duso et al. | |
| 5,956,716 A | 9/1999 | Kenner et al. | |
| 6,078,929 A | 6/2000 | Rao | |
| 6,269,394 B1 | 7/2001 | Kenner et al. | |
| 6,320,600 B1 * | 11/2001 | Smith et al. | 715/723 |
| 6,564,380 B1 * | 5/2003 | Murphy | 725/86 |
| 6,633,918 B2 | 10/2003 | Agarwal et al. | |
| 6,654,506 B1 | 11/2003 | Luo et al. | |
| 6,710,785 B1 | 3/2004 | Asai et al. | |
| 6,715,126 B1 * | 3/2004 | Chang et al. | 715/201 |

(Continued)

FOREIGN PATENT DOCUMENTS

JP 2006270587 10/2006

OTHER PUBLICATIONS

Marco Furini and Marco Aragone; "An Audio/Viedo Analysis Mechanism for Web Indexing"; ACM; May 22-26, 2006; pp. 1-2.*

(Continued)

*Primary Examiner* — Ella Colbert
(74) *Attorney, Agent, or Firm* — Gates & Cooper LLP

(57) ABSTRACT

A web-based video editing system configured to edit an interactive video is provided. The web-based video editing system includes an editing system configured to receive and process one or more user interactive video editing requests, wherein the editing system is configured to process the requests by generating information indicative of a linked list; a communication device configured to: receive the generated information; examine a current state of the interactive video; and generate information indicative of the examined current state of the video; and a graphical user interface in communication with the communication device and configured to display the edited interactive video.

14 Claims, 6 Drawing Sheets

U.S. PATENT DOCUMENTS

| | | | |
|---|---|---|---|
| 6,948,120 B1* | 9/2005 | Delgobbo et al. | 715/207 |
| 6,952,221 B1* | 10/2005 | Holtz et al. | 715/723 |
| 6,993,787 B1 | 1/2006 | Kamel et al. | |
| 7,034,848 B2 | 4/2006 | Sobol | |
| 7,058,721 B1 | 6/2006 | Ellison et al. | |
| 7,158,676 B1 | 1/2007 | Rainsford | |
| 7,174,561 B2 | 2/2007 | Bixby et al. | |
| 7,188,088 B2* | 3/2007 | Iwata et al. | 705/59 |
| 7,302,274 B2 | 11/2007 | Makela et al. | |
| 7,330,194 B2* | 2/2008 | Matsumoto et al. | 345/620 |
| 7,356,575 B1* | 4/2008 | Shapiro | 709/220 |
| 7,508,961 B2 | 3/2009 | Chen et al. | |
| 7,594,168 B2* | 9/2009 | Rempell | 715/234 |
| 7,606,926 B1 | 10/2009 | Chen et al. | |
| 7,620,073 B2 | 11/2009 | Robinett et al. | |
| 7,725,812 B1* | 5/2010 | Balkus et al. | 715/202 |
| 7,877,260 B2* | 1/2011 | Takagi et al. | 704/270.1 |
| 7,882,519 B2 | 2/2011 | Wachtfogel et al. | |
| 7,934,011 B2* | 4/2011 | Gavin et al. | 709/231 |
| 2001/0049715 A1 | 12/2001 | Kidder | |
| 2002/0032663 A1 | 3/2002 | Messner | |
| 2002/0046118 A1* | 4/2002 | Minte | 705/14 |
| 2002/0114535 A1 | 8/2002 | Luo | |
| 2002/0116716 A1* | 8/2002 | Sideman | 725/91 |
| 2002/0156910 A1 | 10/2002 | Senda | |
| 2003/0023564 A1 | 1/2003 | Padhye et al. | |
| 2003/0028873 A1 | 2/2003 | Lemmons | |
| 2003/0122862 A1 | 7/2003 | Takaku et al. | |
| 2003/0140159 A1 | 7/2003 | Campbell et al. | |
| 2003/0146915 A1 | 8/2003 | Brook et al. | |
| 2003/0234803 A1 | 12/2003 | Toyama et al. | |
| 2003/0234805 A1 | 12/2003 | Toyama et al. | |
| 2004/0179719 A1 | 9/2004 | Chen et al. | |
| 2004/0228528 A1 | 11/2004 | Lao | |
| 2005/0025387 A1 | 2/2005 | Luo | |
| 2005/0060422 A1* | 3/2005 | Rudolph et al. | 709/231 |
| 2005/0084232 A1 | 4/2005 | Herberger et al. | |
| 2005/0114462 A1 | 5/2005 | Mathew et al. | |
| 2005/0132293 A1 | 6/2005 | Herberger et al. | |
| 2005/0210393 A1 | 9/2005 | Maeng | |
| 2005/0248681 A1 | 11/2005 | Nozaki et al. | |
| 2005/0276477 A1 | 12/2005 | Lin et al. | |
| 2005/0278636 A1 | 12/2005 | Nomoto | |
| 2005/0283547 A1 | 12/2005 | Parry et al. | |
| 2006/0023969 A1 | 2/2006 | Lara et al. | |
| 2006/0026507 A1 | 2/2006 | Balinsky et al. | |
| 2006/0074769 A1 | 4/2006 | Looney et al. | |
| 2006/0095944 A1 | 5/2006 | Demircin et al. | |
| 2006/0129933 A1 | 6/2006 | Land et al. | |
| 2006/0156219 A1* | 7/2006 | Haot et al. | 715/500.1 |
| 2006/0168303 A1 | 7/2006 | Oyama et al. | |
| 2006/0184980 A1 | 8/2006 | Cole | |
| 2006/0200355 A1* | 9/2006 | Sideman | 704/277 |
| 2006/0206526 A1 | 9/2006 | Sitomer | |
| 2006/0238827 A1 | 10/2006 | Ikeda et al. | |
| 2006/0253542 A1 | 11/2006 | McCausland et al. | |
| 2006/0288392 A1 | 12/2006 | Fleming | |
| 2007/0038703 A1 | 2/2007 | Tendjoukian et al. | |
| 2007/0189708 A1 | 8/2007 | Lerman et al. | |
| 2008/0052090 A1 | 2/2008 | Heinemann et al. | |
| 2008/0143875 A1 | 6/2008 | Scott et al. | |
| 2008/0172704 A1 | 7/2008 | Montazemi | |
| 2009/0167883 A1 | 7/2009 | Nozaki | |
| 2009/0196570 A1 | 8/2009 | Dudas et al. | |

OTHER PUBLICATIONS

Ticker Symbol; "Sony Electronics 4: Sony Inspires New Level of Creativity with the Introduction of Desktop Computers Featuring Penitum II Processors with AGP Graphics and PCI Audio; New Desktop Systems Let Users Set Their Imaginations Free Trhough "Creativity Program" Software Bundle"; Sep. 19, '997; pp. 1-3.*

Levitt, Jason; "Microsoft's IE 5.5 fails the test"; Jul. 31, 2000; pp. 1-3.*

Levitt, Jason; "Microsoft's IE 5.5 Fails the Test—The many proprietary extensions to industry standards that Microsoft has implemented in the new version of its Internet Explorer browser may very well frustrate and alienate the Internet and E-commerce developers that the company most wants to attract. (Software Review)(Evaluation)"; Jul. 31, 2000;pp. 1-3.*

M2 Presswire; "Pinnacle Systems unveils DV500 DVD; Real-time DV editing and DVD authoring solution delivers best value for cost-conscious corporate/prosumer videographers looking for faster dv production"; Apr. 24, 2002; p. 1.*

Dulaney, John R., Domingo, Joel Santo, and Stone M. David; Business-(Gateway E-6610D SB personal computer)(Dell 3110cn color laser printer)(NEC MultiSyn 195WXM liquid Crystay displays) (Samsung SyncMaster 205T Liquid crystal displays)(product/service evaluation); Feb. 20, 2007; pp. 1-2.*

"iMovie HD Tutorial: Apple—iLife—Tutorials—iMovie HD—Arranging Your Clips"; http://www.apple.com/ilife; dated Oct. 9, 2006; 6 pages.

"Welcome to eyespot"; http://www.eyespot.com; dated Oct. 12, 2006; 8 pages.

"MAGIX"; http://site.magix.net; dated Oct. 12, 2006; 11 pages.

"Oddcast—Media Mixers"; http://www.oddcast.com/home; http://videomixer.chrysler.com/chrvideomixer.php?door=28&src=vm2chrysler.swf; dated Oct. 16, 2006; 20 pages.

"Jumpcut—Create"; http://www.jumpcut.com/create/edit; dated Oct. 16, 2006; 3 pages.

International Search Report for Application No. PCT/US08/01130 filed Jan. 28, 2008, dated Jun. 18, 2008, mailed Aug. 1, 2008, 2 pages.

Written Opinion for Application No. PCT/US08/01130 filed Jan. 28, 2008, dated Jun. 18, 2008, mailed Aug. 1, 2008, 4 pages.

International Search Report and Written Opinion for PCT/US08/01138 dated Jun. 11, 2008, 6 pages.

International Search Report and Written Opinion for PCT/US08101139 dtd May 14, 2008, 6 pages.

International Search Report and Written Opinion for PCT/US08152367 dated Apr. 9, 2008, 5 pages.

International Search Report and Written Opinion for PCT/US08162309 dated Jul. 2, 2008, 6 pages.

"MyHeritage face recognition," http://web.archive.org./web/20061018223823/www.myheritage.com/FP/Company/face-rec...; dated Aug. 24, 2008; 2 pages.

"Planning and Using Infomercial Campaigns Effectively" dated Sep. 1, 1995 by Gene Silverman and published in Direct Marketing (hereinafter "Silverman"), pp. 1 to 8, 37 pages.

"Riya—Visual Search;" http://www.riya.com/learnMore; dated Aug. 25, 2008, 7 pages.

* cited by examiner

SYSTEM AND METHOD FOR EDITING WEB-BASED VIDEO

CROSS REFERENCE TO RELATED APPLICATIONS

This application claims priority to and the benefit of U.S. Provisional Application No. 60/897,544, filed on Jan. 26, 2007, which is incorporated by reference as if set forth in full herein. This application is also related to the co-pending U.S. Provisional Application No. 60/897,552, filed on Jan. 26, 2007, titled "Video Downloading and Scrubbing System and Method" U.S. Provisional Patent Application No. 60/897,558, filed on Jan. 26, 2007, titled "Real Time Online Video Editing System and Method" U.S. Provisional Patent Application No. 60/897,559, filed on Jan. 26, 2007, titled "Payment System and Method for Web-Based Video Editing System" U.S. Provisional Patent Application No. 60/898,201, filed on Jan. 29, 2007, titled "Image Editing System and Method" Provisional Patent Application No. 60/913,204, filed on Apr. 20, 2007, titled "Image Editing System and Method" , and U.S. Provisional Patent Application No. 60/915,427, filed on May 1, 2007, titled "System and Method for Flow Control in Web-Based Movie Editing System" the entire contents of each of which are expressly incorporated herein by reference.

FIELD OF THE INVENTION

The present invention relates to web-based video editing systems and methods, and more particularly, to a web-based video editing system and method for web-based video incorporating temporal, non-temporal and audio data.

DETAILED DESCRIPTION OF THE INVENTION

Figure 1:
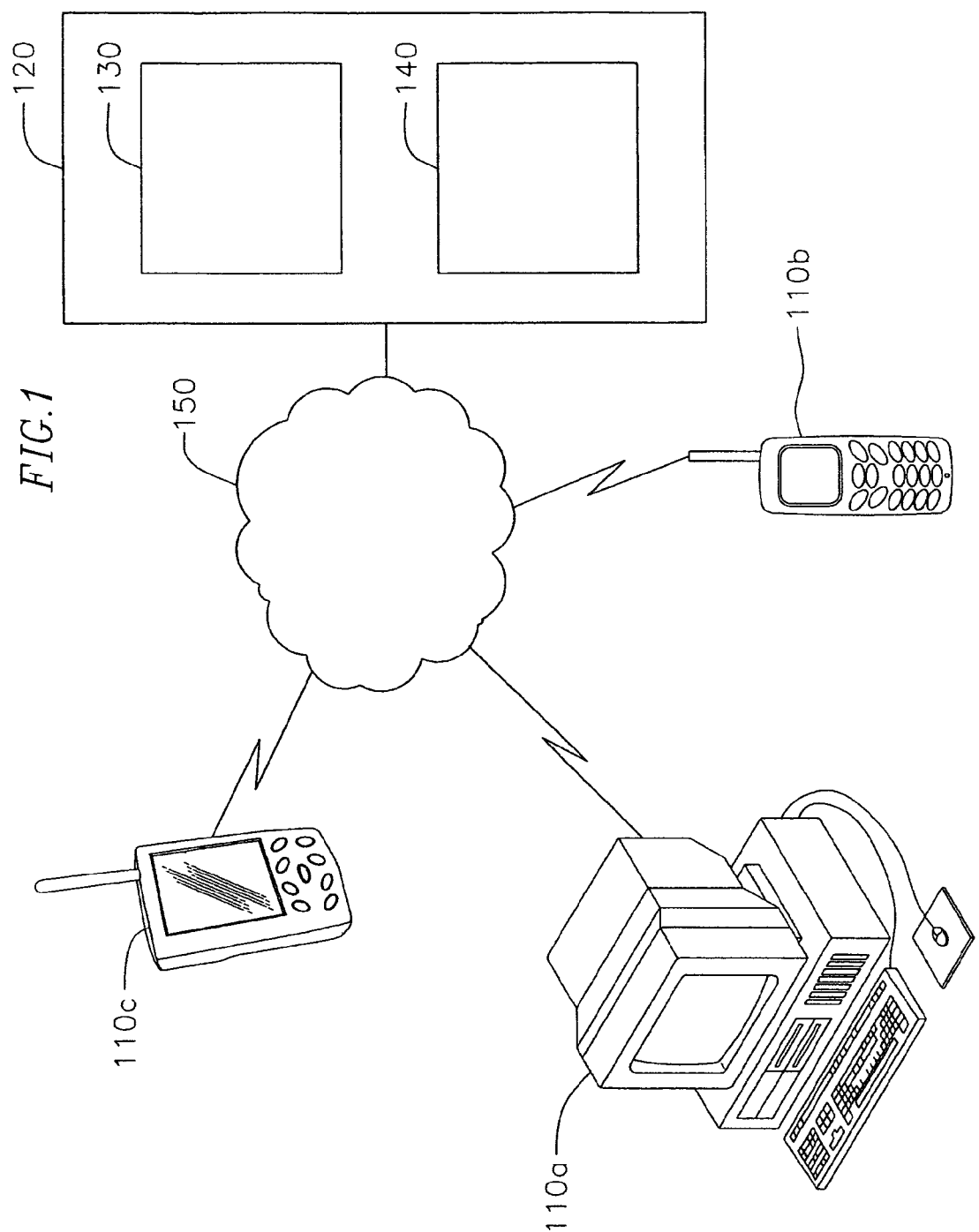
FIG. 1 is a block diagram of a web-based video editing system according to a first embodiment of the present invention.

FIG. 1 is a block diagram of a web-based video editing system according to a first embodiment of the present invention. The editing system includes one or more communication devices, a server 120 having a connection manager 130 and an editing system 140 operating on the server, and a network 150 over which the one or more communication devices and the server communicate. The communication devices may include, but are not limited to, a personal computer 110a, a mobile telephone 110b, a PDA 110c or any other communication device configured to operate as a client computer to the server. Each of the communication devices is configured with a graphical user interface (GUI) or in communication with a GUI. In some embodiments, a user operates the communication device to display interactive web-based video on the graphical user interface. The network to which the server and devices are coupled may be a wireless or a wireline network and may range in size from a local area network to a wide area network to the Internet. In this embodiment, a dedicated open socket connection exists between the connection manager and the communication devices. The socket connection may allow the creation of a device network including devices/clients and the server components.

In some embodiments, an HTTP-based proxy mechanism may be used in lieu of the socket connection. The HTTP-based proxy mechanism may be used when a direct socket is not feasible.

In some embodiments of the system, one or more client computers are configured to transmit information to and receive information from the server. In some embodiments, each of the client computers is configured to send a query for information and the server is configured to respond to the query by sending the requested information to the client computer. In some embodiments, one or more of the client computers is configured to transmit commands to the server and the server is configured to perform functions in response to the command.

In some embodiments, each of the client computers is configured with an application for displaying multimedia on the graphical user interface of the client computer. The application may be Adobe Flash® or any other application capable of displaying multimedia.

The connection manager is configured to determine the condition of the server and perform asynchronous messaging to one or more of the client computers over the dedicated open socket connection. In some embodiments, the content of the messages is indicative of the state of the server.

The server is configured to receive requests from one or more of the client computers and perform functions in response to the received requests. The server may perform any number of functions typically performed in the server of a web-based video editing system. The server may also provide an editing system for editing video.

In some embodiments, the editing system 140 is executed on the server. In other embodiments, the editing system is executed on a computer that is remote from but in communication with the server. The editing system may be configured to allow a user to edit a web-based video. The user may edit a web-based video by creating a new video or by modifying an existing web-based video.

In some embodiments, the editing system 140 is executed on the server. In other embodiments, the editing system is executed on a computer that is remote from but in communication with the server. The editing system may be configured to allow a user to edit a web-based video.

Figure 2:
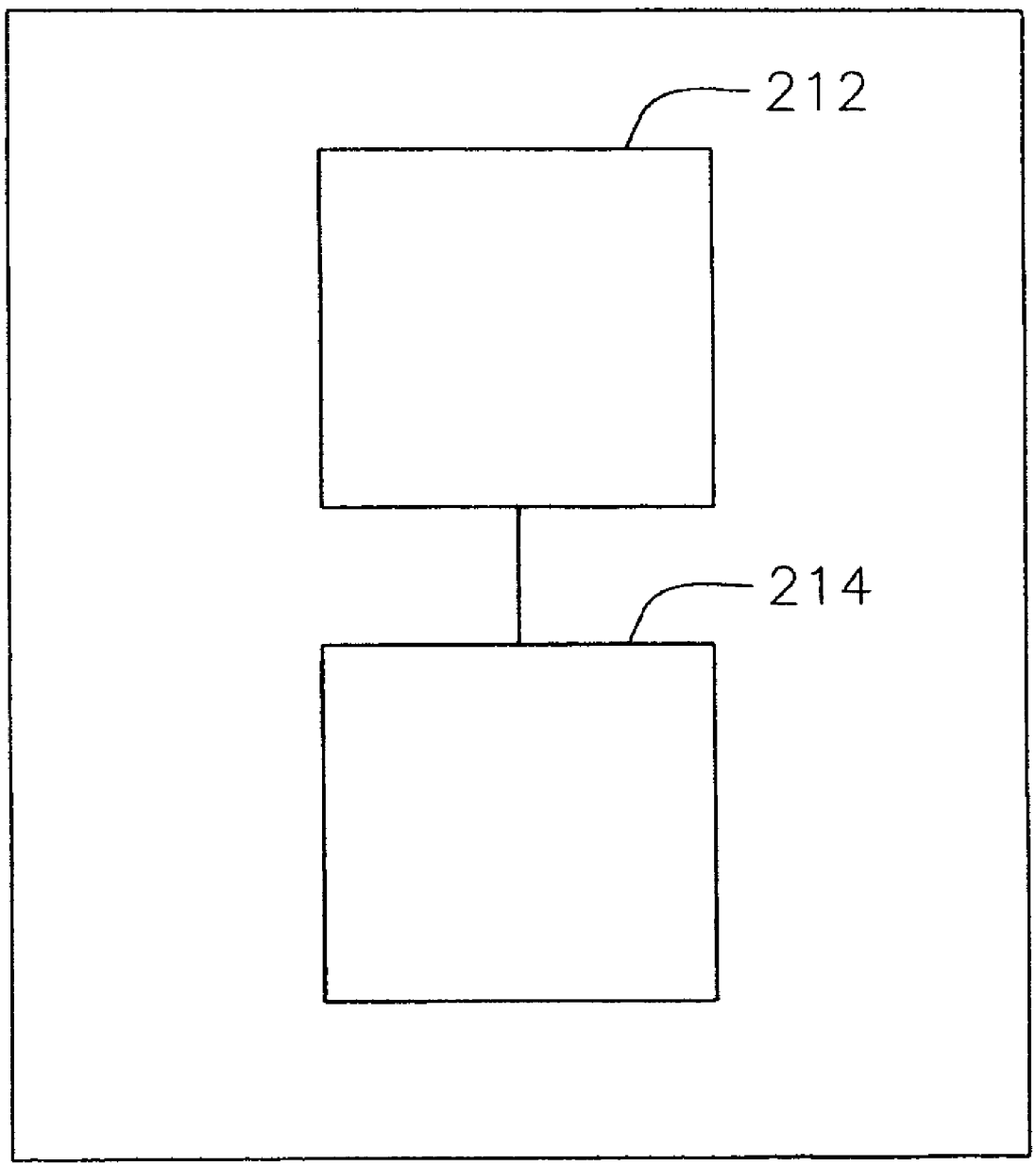
FIG. 2 is a block diagram of an embodiment of an editing system of the web-based video editing system of FIG. 1.

FIG. 2 is a block diagram of an embodiment of an editing system 140 of the web-based video editing system of FIG. 1. In some embodiments, the editing system includes a processor 212, memory 214 and computer code product including instructions stored on the memory and adapted to cause the processor, and thereby cause the editing system, to receive and process user interactive video editing requests and transmit to a communication device information indicative of the processed user interactive video editing request. The memory also stores information indicative of the user interactive video editing requests. The memory may be any type of read-write memory, including, but not limited to, random access memory.

In some embodiments, receiving the user interactive video editing request includes receiving the identity of the user, the selected data that the user desires to include in a web-based video and the location of the data. In some embodiments, the location of the data is relative to other data that is selected. In other embodiments, the location of the data is relative to a location on a timeline for the web-based video that the communication device is configured to display to the user.

In many embodiments, the web-based video produced as a result of the user interactive video editing requests is made of various virtual elements. The virtual elements may be static, such as elements including, but not limited to, a photo or a video within the web-based video production. Static elements often contain additional information for styling, cropping, etc. the content of the web-based video production. Another type of virtual element is a linkage element that defines inter-relationships between static elements. In many embodiments, the linkage elements are part of a linked list. By way of example, but not limitation, a first photo followed by a second photo in a web-based video would have a first linkage to connect the first and the second photos. By way of a further example, to add a third photo between the first photo and the second photo, the first linkage would be destroyed, the third photo would be added to the web-based video production, a second linkage would be added between the first photo and the third photo, and a third linkage would be added between the third photo and the second photo. In this way the linkages of elements of the web-based video production may be kept separate from the elements themselves. In various embodiments, different types of linkages between static elements are be added as linkage elements. Such linkages are determined by the system designer. Examples of such elements include timelink elements, timeline linkage elements, span elements that span across time, span link elements, and modifier elements (i.e., transitions). In various embodiments, new types may be added to the representation to represent relationships between static elements and even other linkage elements.

In some embodiments, processing the user interactive video editing request includes creating information indicative of a linked list. The information is indicative of one or more data selected by the user and the relative ordering of the selected data.

In some embodiments, transmitting to the communication device information indicative of the processed user interactive video editing request includes transmitting to the communication device the information indicative of the linked list. In some embodiments, the server also transmits to the communication device actual data selected by the user. The selected data may be stored in the editing system or at a remote location coupled to the network of FIG. 1. The data may be data provided by the web-based video editing system or data generated by the user.

The data may include video, audio, a still picture, a photo album, a poll or the like. The data may also include elements composed of coding that performs a selected function, such as a transition. By way of example, an element may include, but is not limited to, a wipe transition effect or a fade transition effect. In some embodiments, the data may be indicative of an advertisement.

The data may also be temporal, non-temporal or audio data. Temporal data includes, but is not limited to, video and effects. Temporal data is active for a duration indicative of the time that the data is active. For example, video is active during a duration indicative of the time length of a selected video file. Non-temporal data includes, but is not limited to, a chat, a poll or a photo album. Non-temporal data is active for an indeterminate amount of time. In various embodiments, for a particular set of non-temporal data, a system designer assigns an initial duration of time during which it is active. The initial duration of time is modified by the duration of time that actually elapses before the user takes an action that terminates the current display of the non-temporal data. In this sense, the initial duration of time could be considered a maximum duration of time in most instances. For example, a duration of time for a photo album is terminated when the user selects a next photograph in the photo album for viewing. By way of another example, a duration of time for a chat is terminated when the user enters a chat comment. The duration of audio data is the time length of a selected audio file.

Figure 3:
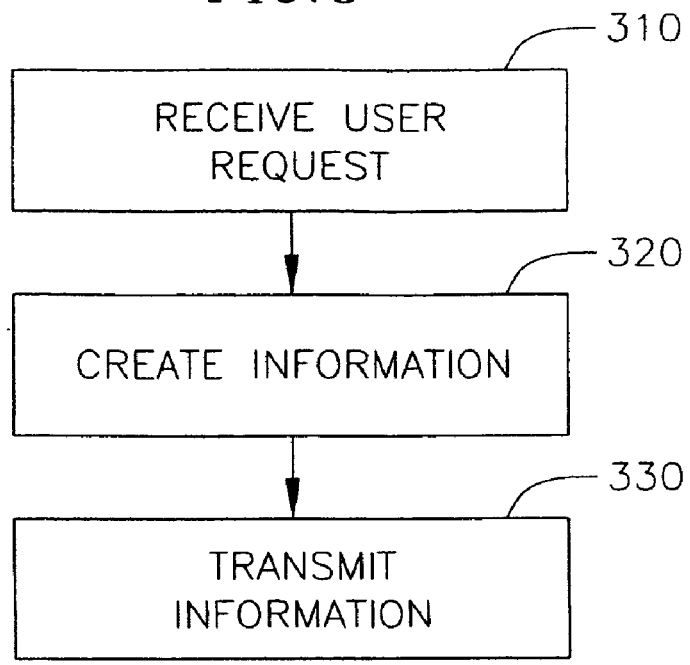
FIG. 3 is a flowchart of a method of operation of the editing system according to some embodiments of the present invention.

FIG. 3 is a flowchart of a method of operation of the editing system according to some embodiments of the present invention. The editing system receives 310 one or more user interactive video editing requests from a user. In some embodiments, the one or more requests include information indicative of the identity of the user, selected data that the user desires to include in an interactive video and the location of the selected data.

The system creates 320 information indicative of a linked list. The information is indicative of one or more data requested by the user and the relative ordering of the data. The system transmits 330 the information to the communication device.

Figure 4:
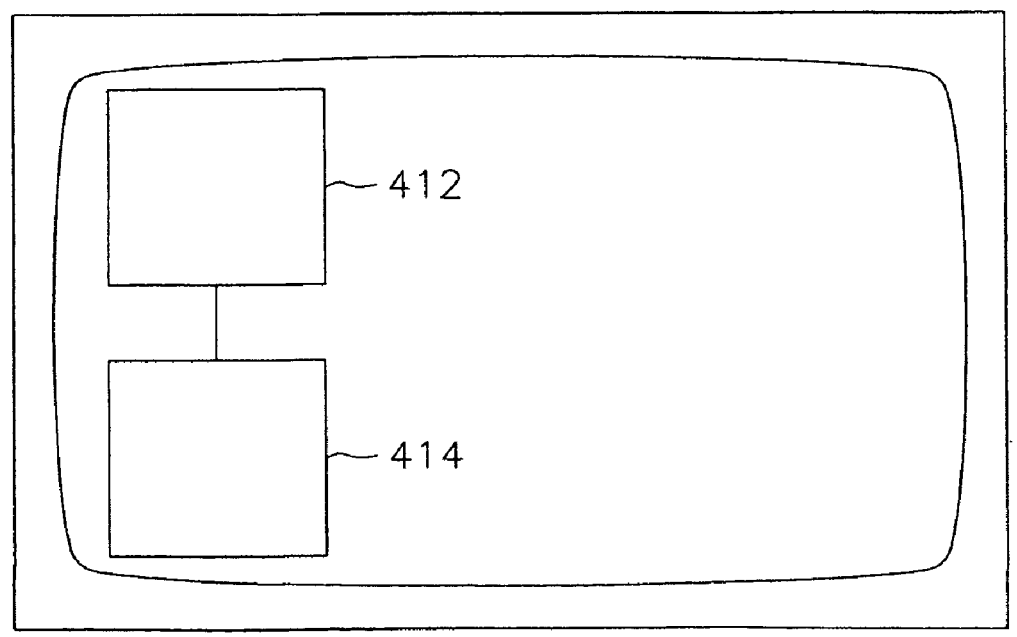
FIG. 4 is a communication device according to an embodiment of the present invention.

FIG. 4 is a communication device according to an embodiment of the present invention. In some embodiments, the communication device is in communication with a GUI. The device may be configured with the GUI or merely in communication with a GUI such that the device may cause the GUI to display information.

In some embodiments, the communication device includes a processor 412, memory 414 and computer code product including instructions stored on the memory and adapted to cause the processor, and thereby cause the communication device system, to receive and process information from the editing system and display on the graphical user interface (GUI) indicators of the received information. The memory also stores information indicative of the user interactive video editing requests. The memory may be any type of read-write memory, including, but not limited to, random access memory.

Figure 4A:
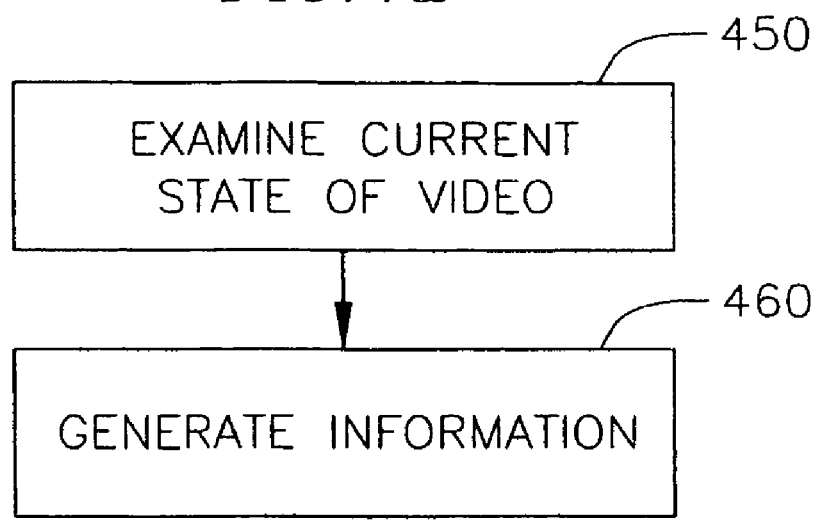

With reference to FIG. 4A, in some embodiments, the received information includes the information indicative of the linked list. In some embodiments, processing the information received from the editing system includes examining 450 the current state of the interactive video and generating 460 information indicative of the examined current state of the interactive video.

Figure 4B:
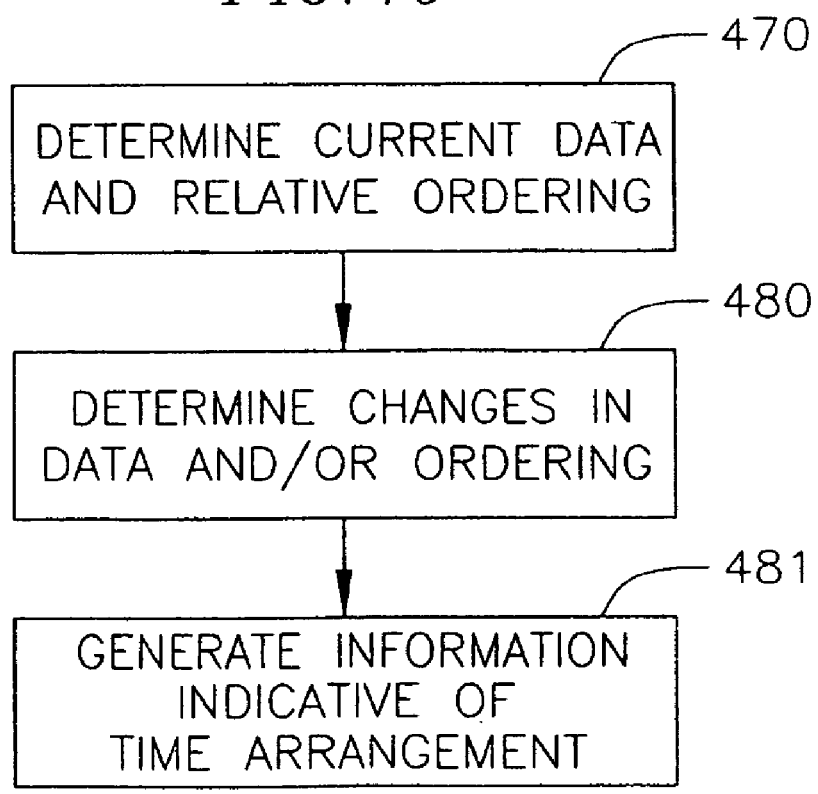
Figure 4C:
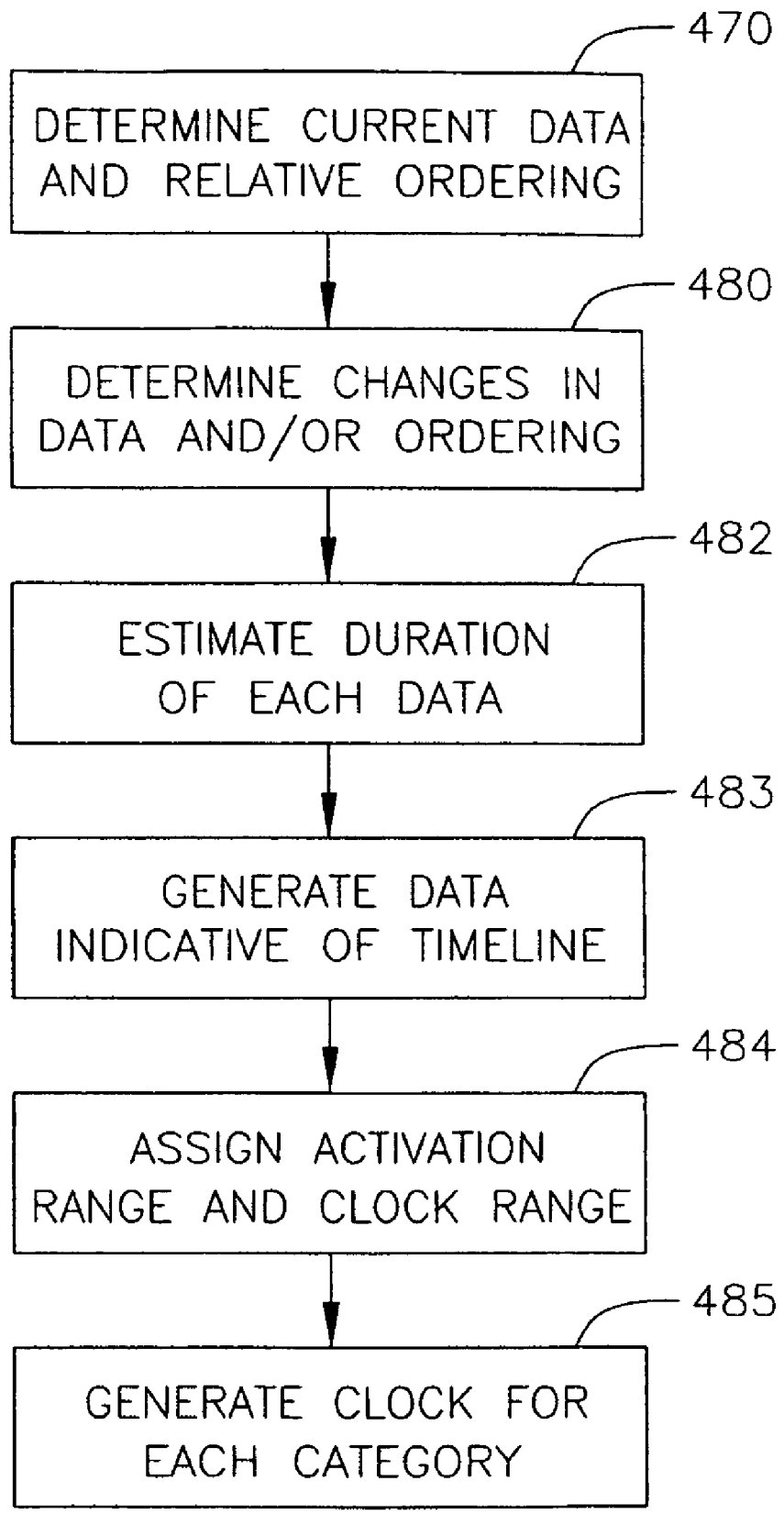

With reference to FIGS. 4A, 4B, and 4C, in some embodiments, examining 450 the current state of the interactive video includes determining 470 the current data and the relative ordering of the data within the video. In some embodiments, each data is categorized as temporal, non-temporal or audio. In other embodiments, each data is categorized in only one category. Audio data is categorized in an audio category in some embodiments.

Returning to FIGS. 4A, 4B, and 4C, examining the current state of the interactive video includes determining 480 one or more changes between a prior version of the video and the version of the video indicative of the linked list received from the editing system. In some embodiments, determining one or more changes between the prior version and the version of the linked list received from the editing system includes determining whether there are changes in the data or relative ordering of the data for the interactive video. In other embodiments, determining one or more changes between the prior version and the version of the linked list is performed according to one or more of the methods described in U.S. provisional patent application entitled "Real Time Online Video Editing System and Method," (F462/58744), the entire content of which is expressly incorporated herein by reference.

In some embodiments, such as shown in FIG. 4B, generating information indicative of the examined current state of the interactive video includes generating 481 information indicative of a time arrangement of the data. The interactive video will be displayed or previewed on the GUI according to the time arrangement of the data.

In many embodiments, one or more data is placed in a time arrangement wherein the data overlaps in time with one or more other data. In many embodiments, audio data overlaps with one or more other data. The one or more other data may be other audio data, temporal data or non-temporal data.

In other embodiments, such as shown in FIG. 4C, generating information indicative of the examined current state of the interactive video includes estimating 482 the duration for each data, generating 483 a set of data indicative of a timeline having discrete points in time during which a data may be active or inactive, assigning 484 an activation range and a clock range for each data and generating 485 a clock for each data categorized as non-temporal and for each data categorized as audio.

In some embodiments, estimating 482 the duration for each data depends on the category of the data. For temporal data or audio data, the device reads information indicative of the data and determines the duration of the file containing the data. For non-temporal data, the device assigns an estimated time dependent on the system design. In some embodiments, the estimated time for non-temporal data is arbitrarily assigned. In some embodiments, the estimated time for non-temporal data is updated to include the actual duration of the data. The actual duration of the data is the time when the data becomes active to the time when the user advances to the next data. In these embodiments, the estimated time is updated while the video is played such as when the user takes action that ends a particular non-temporal data, thereby essentially turning that particular instance of non-temporal data into to temporal data.

In some embodiments, generating a set of data indicative of a timeline includes generating data indicative of points in time. The points in time may begin at time zero or at any other time. The points in time increase with the timeline. All data is placed on the timeline in accordance with the order of the time arrangement of the data. A first data that is before a second data in the time arrangement will be placed at an earlier timeline position that the second data. Accordingly, the data indicative of the timeline may be used to allow a user to scrub to a point in time in the video.

A block of time on the timeline is reserved for each data in the video. The block of time is indicative of the estimated duration of the data. In some embodiments, for non-temporal data, the reserved time on the timeline is updated according to the actual time that elapses before the user advances to the next data.

In some embodiments, assigning activation range for each data includes determining the start time when any form of the data is presented and determining the end times when no form of the data is presented. Assigning a clock range for each data includes determining the start time when full logic of the data is presented and determining the end times when full logic of the data ceases to be presented. By way of example, a data is displayed or previewed as a game with targets falling from the sky during its activation range, although full logic of the game, including moving objects of the targets to prevent the objects from being blown up occurs during the clock range of the data. By way of another example, a fade in effect displays or previews a video before the video animation begins at the beginning of the activation range, although the full logic of the video, including animation, begins at the beginning of the clock range. Accordingly, in one embodiment, the clock range starts after before the activation range starts and ends before the activation range on the timeline.

In some embodiments, a first data overlaps in time with a second data when the first has an activation range that overlaps for any amount of time with the activation range of the second data.

In some embodiments, generating a clock for each data categorized as non-temporal and for each data categorized as audio includes assigning the activation range and the clock range for each data. In one embodiment, for non-temporal data, the starting and ending times of the activation range and the starting and ending times of the clock range is arbitrarily assigned.

In some embodiments, each data is associated with an electronic channel indicative of its category. The data in its category is ordered within the channel based on the start and stop times of the activation range. This allows data in different categories, such as video, polls, chat, and audio, to be displayed independent of each other or with only minimal dependence on each other.

The communication device provides information for presenting the data. In some embodiments, the information provided is the data on the one or more electronic channels. In some embodiments, a master clock in the device maintains a record of time to begin the activation range of any data. Data from one or more channels is provided to be presented to the user while the record of the time is within the activation range for the one or more data. An additional clock is created for each of the channels for non-temporal data and each of the channels for audio data. Each of the additional clocks maintains a record of the time for presenting the non-temporal data or the audio data during a period of time approximately equal to the duration of the activation range. In some embodiments, each of the additional clocks is a standalone clock that is not linked to the master clock.

Accordingly, for example, data on a temporal channel may be presented concurrently with data from an audio channel. Additionally, data on a non-temporal channel may be presented concurrently with data from an audio channel. Further, multiple data may be presented from the non-temporal channel in successive order.

The data may be presented by providing a visual display of the data and/or by providing the sound of the audio data. The sound of the audio data may be provided from a device configured to receive an audio file, convert the audio file into sound and transmit the sound. The sound may be transmitted from a device configured to provide audible sound to a user.

Additionally, multiple clocks for the channels for temporal, non-temporal and audio data allow a user to perform scrubbing across a video that includes temporal and non-temporal data. In some embodiments, the clock for the channel for the temporal data is the master clock. In this embodiment, the master clock stops during the activation range of non-temporal data; however, the clock associated with the non-temporal data executes during the activation range of the non-temporal data. In some embodiments when the master clock is used to designate a point in time to which the user would like to scrub, scrubbing to a point in time during which a non-temporal data is presented accurately reflects the point in time because the communication device notes the time from the master clock and adds the additional time from the clock associated with the non-temporal data. Other scrubbing may be performed according to U.S. Provisional Patent Application entitled "Video Downloading and Scrubbing System and Method" (F462/58745), the entire content of which is expressly incorporated herein by reference.

Figure 5:
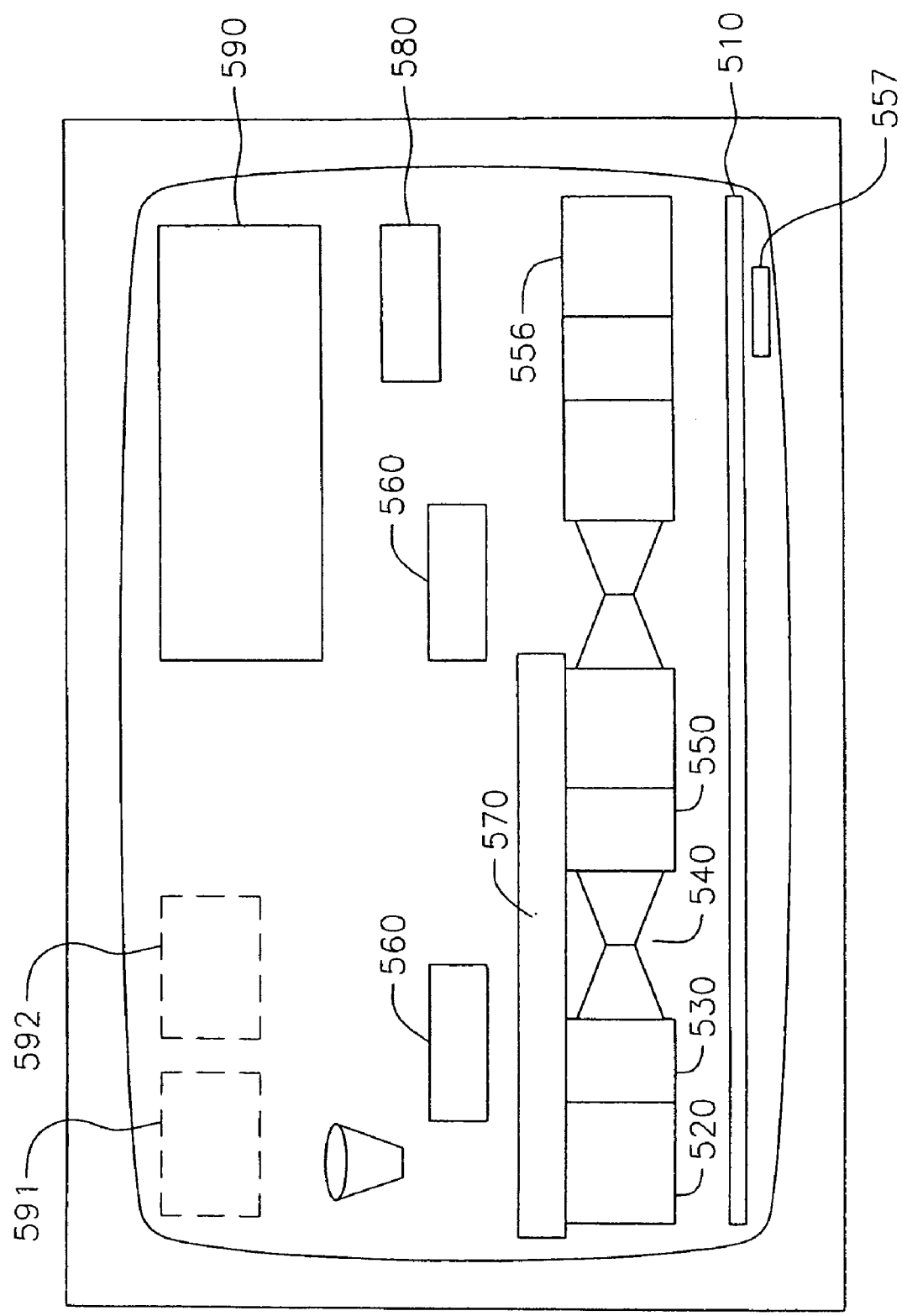
FIG. 5 is an embodiment of a screenshot of a graphical user interface of a communication device of FIG. 4.

FIG. 5 is an embodiment of a screenshot of a graphical user interface of a communication device of FIG. 4. Referring to FIG. 5, the screenshot includes a timeline 510, an image 520 indicative of a first data on the timeline, an image 530 indicative of a second data on the timeline, an image 540 indicative of a third data on the timeline, an image 550 indicative of a fourth data on the timeline and a first indicator 560 indicative of a first type of channel, a second indicator 570 indicative of a second type of channel, a third indicator 580 indicative of a third type of channel.

In some embodiments, the screenshot also includes images 591, 592 indicative of data that a user may select to include in an interactive video. The user may select the data by any number of suitable methods well known to those skilled in the art including, but not limited to, clicking on the image or dragging and dropping the image in a location in the timeline.

In some embodiments, the screenshot may also include an indicator 593 of a wastebasket. One or more images in a timeline may be placed in the wastebasket to remove the corresponding data from the interactive video. The user may drag and drop the image in the region of the screen indicated by the wastebasket.

The timeline provides a visual display of the positioning of data in the time arrangement and the amount of time that has elapsed and is outstanding for the display of data. The display screen 590 is configured to provide a preview of the data currently being presented. The display screen is also configured to receive inputs from a user. Inputs may be entered by touch or by any other suitable method well known to those skilled in the art.

In this embodiment, images 520-550 are images indicative of temporal data. For example, 520, 530, 540, 550 refer to a Flektor system advertisement, a first video, a transition element and a second video, respectively. Accordingly, the third indicator 580 is indicative of a channel for temporal data. In this embodiment, 555 is an image indicative of audio data. Accordingly, the indicator 560 is indicative of a channel for audio data. Further, while the corresponding image is not shown, the indicator 560 is shown overlapping with the image 530 and accordingly, audio data is presented concurrently with temporal data during the time corresponding to these point in time on the timeline.

Image 556 is indicative of non-temporal data. Accordingly, indicator 580 is indicative of a channel for non-temporal data.

In other embodiments, the GUI also displays one or more of: user interface buttons for previewing the interactive video, one or more data to select for incorporation in an interactive video, and a trash can user interface for removing one or more data from an interactive video.

The user may preview the interactive video by requesting to preview the video. In some embodiments, the user can request to preview the video by transmitting a request to the device by depressing a preview button 557 on the screen or by any number of other suitable methods for transmitting a request to the device. In other embodiments, the user may preview a video by any number of methods. The video will be presented via display in the display screen 590.

What is claimed is:

1. A system for editing a multimedia production comprising:
    a server connected to a network;
    a client communications device connected to the network, wherein the client communications device is in communication with the server;
    media storage connected to the server, the media storage including media elements that are used in a multimedia production;
    production storage connected to the server, the production storage including a set of production data that defines a multimedia production that includes a plurality of media channels for simultaneous presentation, each media channel including an ordered set of media elements, the set of production data including, for each of a plurality of the media channels, a linked list of presentation data items, each presentation data item indicative of one or more media elements in the media channel and presentation parameters for presenting the one or more media elements in the multimedia presentation,
    wherein the server is configured to:
        identify each of a plurality of the media elements as either a temporal media element, when a duration of presentation of the media element within the multimedia presentation is determinant from the presentation parameters for that media element, or a non-temporal media element, when a duration of presentation of the media element within the multimedia presentation is not determinant from the presentation parameters for that media element;
        wherein the presentation parameters for at least one non-temporal media element includes criteria for determining the duration of presentation of that media element within the multimedia presentation; and
        wherein the presentation parameters for at least one media element includes a time for beginning the presentation of that media element that is determined by the duration of presentation determined for a non-temporal media element from the criteria included in the presentation parameters for that non-temporal media element;
    wherein the server is further configured to:
        receive a multimedia production editing command from the client communications device; and
        determine whether the multimedia production editing command makes the criteria for any non-temporal media element indeterminant and when the multimedia production editing commamd makes the criteria for any non-temporal media element indeterminant, send a communication to the client communications device that replacement criteria for criteria made indeterminant must be supplied for the production editing command to be executed.

2. The system of claim 1 wherein the server includes the media storage.

3. The system of claim 1 wherein the server includes the production storage.

4. The system of claim 1 wherein the server includes the media storage and the production storage.

5. The system of claim 1 wherein the client communications device comprises a graphical user interface.

6. The system of claim 5 wherein the client communications device comprises at least one selected from the group consisting of: a personal computer, a laptop computer, a handheld computer, a phone, and a video player.

7. The system of claim 1 wherein the network is the Internet.

8. A method for editing a multimedia production using a server connected to a network, media storage connected to the server, the media storage including media elements that are used in a multimedia production, production storage connected to the server, the production storage including a set of production data that defines a multimedia production that includes a plurality of media channels for simultaneous presentation, each media channel including an ordered set of media elements, and a client communications device connected to the network wherein the client communications device is in communication with the server, the method comprising:

for each of a plurality of the media channels in a set of production data, maintaining a linked list of presentation data items, each presentation data item indicative of one or more media elements in the media channel and presentation parameters for presenting the one or more media elements in the multimedia presentation, identifying each of a plurality of the media elements as either a temporal media element, when a duration of presentation of the media element within the multimedia presentation is determinant from the presentation parameters for that media element, or a non-temporal media element, when a duration of presentation of the media element within the multimedia presentation is not determinant from the presentation parameters for that media element;

after identifying a media element as the non-temporal media element, establishing criteria for determining the duration of presentation of that non-temporal media element within the multimedia presentation; and for at least one media element, setting a time for beginning the presentation of that media element that is determined by the duration of presentation determined for a non-temporal media element from the criteria included established for that non-temporal media element;

receiving, by the server, a multimedia production editing command from the client communications device; and determining, by the server, whether the multimedia production editing command makes the criteria for any non-temporal media element indeterminant and when the multimedia production editing command makes the criteria for any non-temporal media element indeterminant, sending a communication to the client communications device that replacement criteria for criteria made indeterminant must be supplied for the production editing command to be executed.

9. The method of claim 8 wherein the server includes the media storage.

10. The method of claim 8 wherein the server includes the production storage.

11. The method of claim 8 wherein the server includes the media storage and the production storage.

12. The method of claim 8 wherein the client communications device comprises a graphical user interface.

13. The method of claim 12 wherein the client communications device comprises at least one selected from the group consisting of a personal computer, a laptop computer, a handheld computer, a phone, and a video player.

14. The method of claim 8 wherein the network is the Internet.

* * * * *